United States Patent [19]

Kuhn et al.

[11] 3,954,450

[45] May 4, 1976

[54] RECOVERY OF LEAD, ZINC AND IRON SULFIDE

[75] Inventors: Martin C. Kuhn; Nathaniel Arbiter, both of Tucson, Ariz.

[73] Assignee: The Anaconda Company, New York, N.Y.

[22] Filed: Mar. 26, 1975

[21] Appl. No.: 562,393

[52] U.S. Cl. .............................. 75/103; 75/101 R; 75/115; 75/2; 75/120; 423/95; 423/106
[51] Int. Cl.² ................ C22B 13/04; C22B 19/26
[58] Field of Search ............... 75/103, 120, 115, 2; 423/106, 95

[56] References Cited
UNITED STATES PATENTS

| | | | |
|---|---|---|---|
| 2,067,778 | 1/1937 | Mitchell | 75/110 |
| 2,576,314 | 11/1951 | Forward | 75/103 X |
| 2,726,934 | 12/1955 | Forward et al. | 75/103 X |
| 2,822,263 | 2/1958 | Forward | 75/117 |
| 3,582,317 | 6/1971 | Gamo et al. | 75/2 |
| 3,642,467 | 2/1972 | Bratt et al. | 75/101 R |
| 3,647,423 | 3/1972 | Acoveno | 75/103 |
| 3,867,268 | 2/1975 | Kawulka et al. | 75/120 X |

*Primary Examiner*—G. Ozaki
*Attorney, Agent, or Firm*—Pennie & Edmonds

[57] ABSTRACT

Lead is recovered from lead sulfide concentrates or mixed lead-zinc concentrates containing iron sulfide by forming a slurry of such concentrates in an aqueous medium containing ammonium sulfate and free ammonia, and introducing such slurry into a closed reaction vessel at a pressure not exceeding 30 psig. Oxygen also is introduced into such vessel to establish therein a partial oxygen pressure of at least a few psi, while vigorously agitating the slurry. The lead sulfide content of the concentrates thereby is converted to the form of substantially water-insoluble oxidic lead compounds, while any zinc sulfide present is dissolved. The slurry then is withdrawn from the reaction vessel and the insoluble residue is separated from the aqueous solution. The latter is treated for recovery of its zinc and ammonia content, and the residue is subjected to a froth flotation operation to form a concentrate containing substantially all the iron sulfide and a tailing containing the oxidic lead compounds. Lead is recovered from such tailing.

10 Claims, 1 Drawing Figure

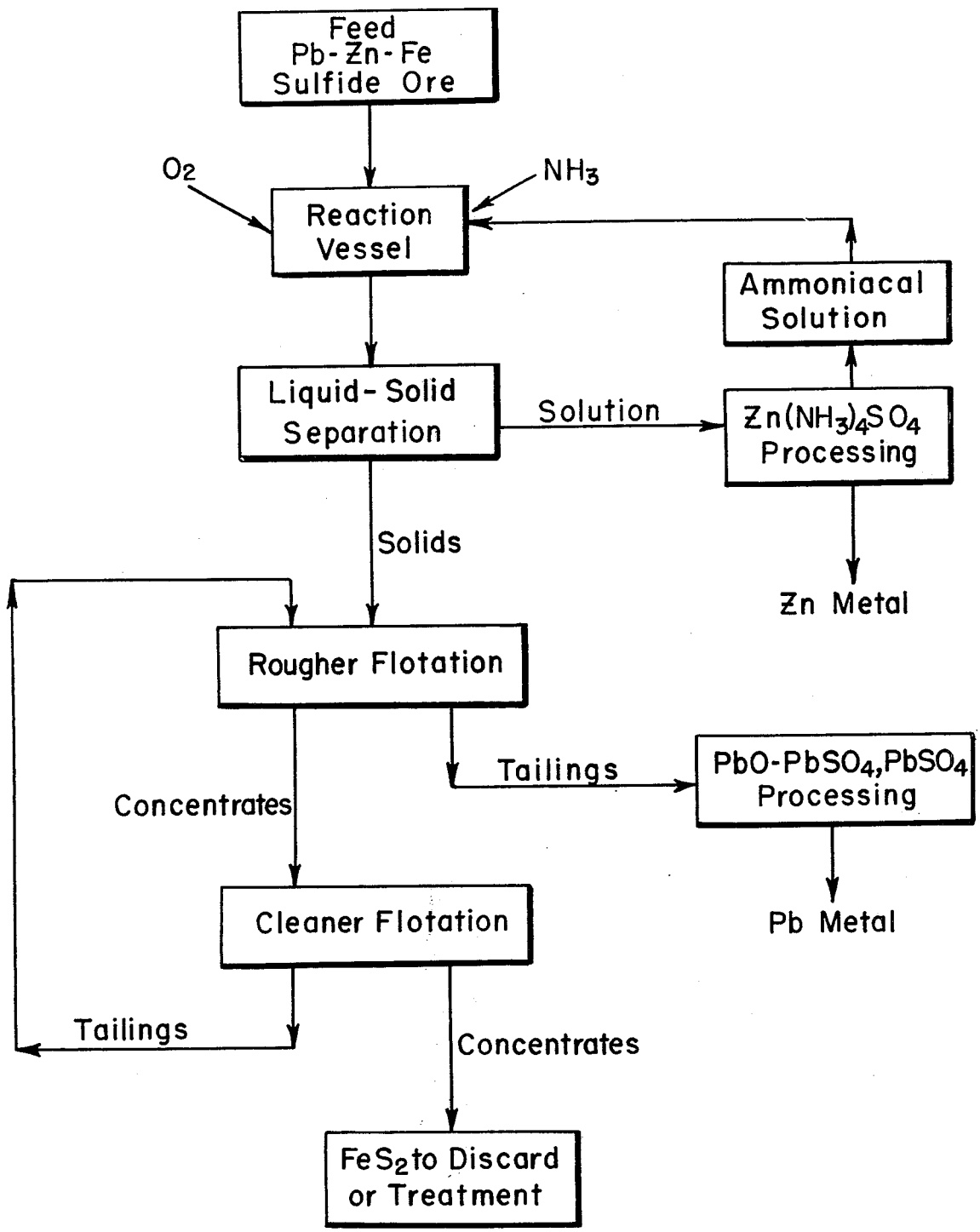

RECOVERY OF LEAD, ZINC AND IRON SULFIDE

BACKGROUND OF THE INVENTION

Lead sulfide (galena) is usually found in association with iron sulfide (pyrite), and often with zinc sulfide (sphalerite). The conventional procedure for treating ores of such composition is by selective froth flotation, to obtain lead in the form of a high grade lead concentrate and zinc in the form of a high grade zinc concentrate. Such concentrates then are treated separately for the recovery of their metal values.

However, many fine-grained massive sulfide lead-zinc ores cannot be satisfactorily treated by flotation to produce a high grade lead concentrate. If the lead cannot be liberated satisfactorily by grinding, dilution of the concentrate by pyrite can result in a concentrate which is not suited for treatment by conventional methods, or it may result in inability to produce separate lead and zinc concentrates adequately freed of zinc and lead respectively. Efforts to produce satisfactory concentrates from such ores by refinements in flotation techniques have been the chief procedure used heretofore to treat such ores, but have met with only indifferent success. Smelting processes heretofore proposed to treat mixed lead-zinc concentrates, and low grade lead concentrates high in iron sulfide, are costly and unsatisfactory.

It has been known heretofore that zinc from zinc sulfide ores and concentrates will dissolve in an ammoniacal solution under oxidizing conditions. For example, the Forward U.S. Pat. No. 2,822,263, which is directed primarily to the recovery of copper and nickel from sulfide ores and concentrates by leaching under pressure with an oxidizing ammoniacal solution, mentions that zinc also dissolves in such leaching operations. However, lead sulfide generally does not dissolve in ammoniacal solutions, and no proposal has to our knowledge been made heretofore to use such solutions for recovery or upgrading the lead content of lead sulfide concentrates.

STATEMENT AND NATURE OF THE INVENTION

The invention provides a method for recovering lead from a finely divided lead-bearing mineral concentrates containing iron sulfide, which comprises forming a slurry of such concentrates in an aqueous medium containing ammonium sulfate and free ammonia, introducing such slurry into a closed reaction vessel at a pressure not exceeding 30 psig (pounds per square inch gauge) while vigorously agitating the slurry. Under the conditions thus established in the reaction vessel, the sulfidic lead content of the mineral is substantially oxidized to the form of substantially water-insoluble oxidic lead compounds. Eventually the slurry is withdrawn from the reaction vessel and the insoluble residue is separated from the aqueous solution. Such residue then is subjected to a froth flotation operation to form a concentrate containing substantially all the iron sulfide and a tailing containing substantially all the oxidic lead compounds, and such tailing is recovered.

When the concentrate feed contains zinc as well as lead, the zinc sulfide dissolves in the aqueous ammoniacal solution, and such solution after being separated from the insoluble residue may be treated in any desired manner to recover its zinc content.

Iron sulfide (pyrites) passes through the oxidizing treatment in the ammoniacal solution substantially unchanged. It is this fact that makes possible an easy separation by froth flotation of the residual pyrite from the oxidized lead compounds.

The slurry in the reaction vessel is preferably at a temperature in the range from 50°C., or even 60°C., up to the boiling temperature at the prevailing pressure. The slurry preferably is mechanically agitated in the reaction vessel with a vigor of at least 0.05 horsepower, or even 0.1 horsepower, per cubic foot. The total pressure need not be very high — usually no more than 3 to 8 psig. The pH of the slurry is not critical, but at desirable free ammonia concentrations is generally in the range from 9 to 11.

It is especially desirable to continuously recirculate oxygen-bearing gas from above the body of slurry in the reaction vessel into said body at a substantial depth below its surface. Such recirculation is of importance to maximize oxidation of the lead sulfide in a minimum of time.

DESCRIPTION OF THE DRAWING

The single FIGURE of the accompanying drawing is a flowshet of an advantageous embodiment of the invention.

DESCRIPTION OF THE INVENTION

The invention is described below with reference to the embodiment schematically portrayed on the flowsheet.

Sulfidic ores containing minerals of lead sulfide (galena), iron sulfide (mostly pyrite) and perhaps also zinc sulfide (usually sphalerite) are preferably concentrated by froth flotation prior to treatment in accordance with the invention. Such concentration is important in order to eliminate the nonsulfidic gangue which, if allowed to enter the process, would for the most part follow through with the lead and dilute the final lead product of the process. Such concentration is by conventional flotation procedures, but it is not necessary that the grade of the concentrate be high or that separation of the zinc from the lead be effected, or if effected, that the lead concentrates be very completely free of zinc. So long as the concentrate is largely freed of non-sulfidic gangue, the process of the invention is effective for producing a high grade lead product substantially completely free of zinc and iron. Other sulfide minerals may be present, such as copper sulfide (e.g. chalcocite or chalcopyrite) or cadmium sulfide (greenockite) without impairing the efficacy of the process. Copper dissolves with the zinc and may be separated from it in treating the solution product for zinc recovery, and cadmium sulfide also dissolves with the zinc and can be separately recovered from the reaction solution.

The sulfide concentrate feed to the process is in the finely divided form common to flotation concentrates. Such fine particle size is important to secure rapid and effective reaction with the ammoniacal solution. Such feed is formed into a slurry in an ammonium sulfate solution containng free ammonia. The conconcentration of ammonium sulfate is not especially critical. In fact, it is not necessary that any ammonium sulfate be present in the slurry as it is made up for introduction into the reaction vessel. However, ammonium sulfate is produced as a result of reactions that take place, and recovered ammoniacal solution which is recycled to the reaction vessel will contain at least some ammonium sulfate, so as a practical matter it is present throughout the process.

The slurry of concentrate and ammoniacal solution, advantageously containing 15% to 20% by weight solids, is introduced into a closed reaction vessel, and gaseous ammonia and gaseous oxygen are sparged into the slurry in the vessel. The pH of the aqueous phase of the slurry is preferably maintained in the range from 9 to 11 in the reaction vessel, in order to insure the presence of free ammonia in optimum concentration. This may be done by controlled addition of gaseous ammonia to the solution in the reaction vessel. The concentration of free ammonia preferably is correlated with the temperature of the slurry to maintain the pH at a value between 9 and 11 such that the sum of the partial pressures of ammonia and water vapor over the slurry is at least several psi below the total pressure in the reaction vessel. It is of course necessary for the total pressures to exceed the sum of the ammonia and water vapor partial pressure to allow for the admission of oxygen to the system, and it is desirable for the oxygen partial pressure to be at least several psi and advantageously about 5 or 6 psi.

The invention particularly contemplates the use of commercially pure oxygen to supply oxygen to the system. The use of air involves adding a considerable partial pressure of nitrogen to the total pressure of the system; and since it is a major feature of the invention to operate at or not much above atmospheric pressure, it is best to add substantially pure oxygen and to avoid the continual addition of nitrogen which would accompany the addition of air.

The process of the invention can be carried out at atmospheric pressure. However, closed leaching vessels are necessary to avoid loss of free ammonia and otherwise to control conduct of the operation Moreover, at the higher temperatures in the range desirable for reasonably rapid progress of the oxidation reactions (50° to 100°C.) and at the preferred pH values in the range from 9 to 11, the sum of ammonia and water vapor partial pressures approaches closely to atmospheric. It is therefore advantageous to operate the leaching vessels under a positive pressure, which, however, should be low enough to permit using equipment (leaching vessels, gas seals for closed systems, shaft packings, etc.) designed essentially for atmospheric pressure, and to make unnecessary the more costly equipment required for autoclave operation. To this end a pressure below about 30 psig should be used, and often it will be below 20 psig or even below 10 psig. Generally a total pressure in the range from 3 to 8 psig is very satisfactory.

The temperature of the slurry in the reaction vessel is preferably in the range from 50°C. to the boiling temperature at the prevailing pressure. Particularly when the concentrates contain a substantial amount of zinc, it is desirable for the temperature to be above 60°C. or 65°C., and temperatures above 90° are best to insure rapid and complete dissolution of zinc sulfide.

Vigorous mechanical agitation of the slurry, preferably by a motor driven impeller extending through the closed top of the reaction vessel, is of primary importance for promoting rapid progress of the reaction which takes place in the vessel. Agitation vigor preferably is at least about 0.05 horsepower per cubic foot, and it may be upwards even of 0.1 horsepower input to the impeller per cubic foot of slurry in the vessel. With less vigorous agitation the efficiency and rate of oxidation of the concentrate is significantly reduced.

It is particularly desirable continuously to recirculate oxygen-bearing gas from above the body of slurry into said body at a substantial depth below the surface of the body during the course of the leaching operation. Such recirculation of oxygen may be carried out independently of the agitation of the slurry, by use of an external gas recirculation pump or blower drawing from the atmosphere above the slurry and discharging into the slurry at or near the bottom of the reaction vessel. Alternatively, recirculation of oxygen may be performed coincidentally with agitation by use of a sub-aeration type of impeller to agitate the slurry and at the same time to draw oxygen-bearing gas from above the surface of the slurry and discharge it into the slurry in the region of intense slurry agitation.

Forced recirculation of oxygen through the body of slurry is not essential in all cases to success of the new process, but it is important for securing a high degree of concentrate oxidation in a minimum of time.

In the reaction vessel, any zinc sulfide and cadmium sulfide is dissolved substantially in accordance with the following reactions:

$$ZnS + 4NH_3 + 2O_2 \rightarrow Zn(NH_3)_4^{++} + SO_4^{--} \quad (1)$$

$$CdS + 4NH_3 + 2O_2 \rightarrow Cd(NH_3)_4^{++} + SO_4^{--} \quad (2)$$

If copper sulfide is present, it too dissolves:

$$Cu_2S + 8NH_3 + 2O_2 \rightarrow 2Cu(NH_3)_4^{++} + SO_4^{--} \quad (3)$$

Lead sulfide, however, is converted to a basic lead sulfate, or to lead sulfate, both of which are substantially insoluble:

$$2PbS + 4O_2 + H_2O \rightarrow PbO \cdot PbSO_4 + SO_4^{--} + 2H^+ \quad (4)$$

$$PbS + 2O_2 \rightarrow PbSO_4 \quad (5)$$

On the other hand, iron sulfide is unaffected by the oxidizing conditions in the ammoniacal solution, and pass through the reaction vessel chemically unaltered.

The time required for these oxidation reactions to reach substantial completion is generally in the range from 3 to 8 hours, 5 to 7 hours being typical. It is generally possible in such a length of time to extract into the aqueous phase about 95% or more of the whatever zinc and cadmium may be present in a typical lead sulfide concentrate containing significant proportions of sphalerite and greenockite. Substantially shorter leaching times suffice when the leaching operation is carried out at pressures slightly above atmospheric (e.g. at 15 to 25 psig).

The aqueous phase of the slurry withdrawn from the reaction vessel contains the dissolved zinc and cadmium (and copper, if any) in the form of a metal ammonium complex, and it contains the sulfur component of the dissolved minerals in the form of ammonium sulfate. It also contains residual free ammonia, and some small amounts of sulfamates and thionates. The solid phase, depleted in weight and bulk by the amount of the dissolved minerals, contains substantially all the remainder of the incoming material. It contains in particular the insoluble oxidic lead compounds formed in consequence of the conditions prevailing in the reaction vessel. It also contains unaltered the pyrite content of the concentrates, and any earthy materials such as silica and alumina. It will also usually contain at least a part of any insoluble metal values such as silver and gold.

The aqueous phase is then separated from the solid phase of the slurry at the conclusion of the leaching operation by any conventional procedure, such as decantation thickening or filtration, and is subjected to a froth flotation operation to separate the oxidic lead compounds from the iron sulfide. Such flotation operation is carried out in a conventional manner, preferably in rougher and cleaner stages. The solids separated from the ammonaiacal solution are washed in the course of the liquidsolid separation process, and the washed solids are formed into a flotation pulp of conventional density (e.g. 30–35% solids) in water. Such pulp is conditioned with a collector (e.g. a xanthate) capable of collecting iron sulfide, a frother (e.g. amyl isopropyl carbinol) and lime to adjust the pH to a value between 6 and 10. The conditioned pulp then is introduced into rougher flotation cells, where substantially all the iron sulfide is collected in a concentrate, and most of the oxidized lead compounds are left behind in the tailing.

The rougher tailing constitutes the lead product of the process. It is recovered and may be treated in any desired fashion to produce metallic lead or other marketable lead product. If the original feed contained gold or silver, some of these valuable by-products will be found in the rougher tailing and can be recovered in the treatment of this material.

The rougher concentrates are then refloated in a cleaner flotation operation to produce a final cleaner concentrate of iron sulfide substantially free of any lead compounds. This iron sulfide product may be discarded, or it may be treated in any desired way. Some part of any gold or silver in the original lead concentrates may find its way into this cleaner concentrate, and treatment of it to recover such values may be warranted.

The tailings from the cleaner flotation will contain such oxidic lead compounds as were collected with the rougher concentrates, and preferably are recycled to the rougher flotation operation for retreatment.

EXAMPLES OF THE INVENTION

A low grade lead concentrate were prepared from a fine grained massive sulfide lead-zinc ore. Such concentrates contained 29.0% lead, largely in the form of galena, 2.32% zinc, mainly in the form of sphalerite, 0.98% copper present as difficultly soluble chalcopyrite, about 40% iron as pyrite, and 14.67 oz. per ton of silver. The concentrate was slurried with an aqueous solution of ammonium sulfate and ammonium hydroxide. This slurry was fed into a closed reaction vessel and was heated to about 85°C. Commercially pure oxygen was introduced into the vessel to establish a total pressure of 6 psig, and ammonia gas was admitted to the vessel as required to make up for its consumption and hold the pH of the slurry at about 10.0. The slurry was agitated in the reaction vessel by a mechanical impeller with an input vigor of about 0.1 horsepower per cubic foot of slurry in the vessel. The oxygen-bearing gas overlying the slurry was recirculated vigorously by an external circulation pump from the gas atmosphere above the slurry back into the slurry adjacent the impeller. The retention time of the slurry in the vessel was about two hours to allow for substantially complete dissolution of the zinc and oxidation of the lead sulfide.

At the conclusion of the treatment in the reaction vessel, the slurry was withdrawn from the vessel and the aqueous phase was separated from the solid phase. The zinc-bearing aqueous phase was suitable for treatment for recovery of the zinc and for separate recovery of the ammoniacal solution for recycling and/or ammonia recovery.

The solid phase was subjected to froth flotation, first in a rougher stage to recover a tailing of high lead content, and then in a cleaner stage to produce a pyrite concentrate substantially free of lead. In this Example the cleaner tailing was not returned to the rougher flotation for retreatment.

The feed assay, and the recoveries in the pregnant solution from the reaction vessel and in the flotation products, all in percent by weight except silver, which is in oz. per ton, were shown in the followinng table:

|  | Pb | Cu | Zn | Ag | Fe | S | Pb | Cu | Distribution, % in Feed Zn | Ag | F | S |
|---|---|---|---|---|---|---|---|---|---|---|---|---|
| Feed Assay | 29.0 | 0.98 | 2.32 | 14.67 | 23.4 | 33.7 | 100. | 100. | 100. | 100. | 100. | 100. |
| Pregnant Solution | 0.23 | 0.88 | 3.72 | — | — | 47.4 | 0.60 | 45.18 | 74.72 | — | — | 15.47 |
| Cleaner Concentrate | 3.94 | 0.37 | 1.58 | 17.02 | 38.0 | 45.7 | 5.18 | 14.32 | 23.98 | 43.03 | 68.09 | 54.94 |
| Cleaner Tailing | 2.18 | 1.24 | 0.07 | 26.20 | 28.5 | 30.7 | 4.84 | 8.08 | 0.19 | 10.62 | 8.61 | 6.23 |
| Rougher Tailing | 29.0 | 0.68 | 0.06 | 15.60 | 10.5 | 15.7 | 89.38 | 32.42 | 1.19 | 46.35 | 23.30 | 23.36 |

Substantially all the pyrite present in the feed concentrate was collected in the cleaner concentrate. The time of treatment in the reaction vessel and the reaction conditions did and favor complete dissolution of the copper, so only about half of the copper appeared in the pregnant solution. The silver also was divided about half in the cleaner concentrate and half in the rougher tailing, so that both of these products might profitably be treated for silver recovery. As shown by the distribution data, however, almost 90% of the lead was recovered in the rougher concentrate, and about 75% of the zinc and a significant amount of copper appeared in the pregnant solution. With longer treatment of the feed concentrate in the reaction vessel, preferably at a temperature above 90°C, the recovery of zinc and copper in the pregnant solution could be improved, and the loss of lead in the cleaner concentrate could be reduced.

We claim:
1. The method of recovering lead from a finely divided sulfidic lead-bearing mineral concentrate containing iron sulfide which comprises forming a slurry of said mineral in an aqueous medium containing ammonium sulfate and free ammonia, introducing such slurry into a closed reaction vessel at a pressure not exceeding 30 psig, introducing oxygen into such vessel to establish therein an oxygen partial pressure of at least several psi while vigorously agitating the slurry, whereby the sul- fidic lead content of the mineral is substantially oxidized to the form of substantially water-insoluble oxidic lead compounds, subsequently withdrawing the slurry from the reaction vessel and separating the insoluble residue from the aqueous solution, subjecting said residue to a froth flotation operation to form a concentrate containing substantially all the iron sulfide and a tailing containing substantially all the oxidic lead compounds, and recovering said tailing.

2. The method according to claim 1 wherein the temperature of the slurry is the reaction vessel is in the range from 50°C. to the boiling temperature at the prevailing pressure.

3. The method accordng to claim 1 wherein the slurry in the reaction vessel in mechanically agitated with a vigor of at least 0.05 horsepower per cubic foot.

4. The method according to claim 1 wherein the total pressure maintained in the reaction vessel is in the range from 3 to 8 psig.

5. The method according to claim 1 wherein the pH of the slurry in the reaction vessel is in the range from 9 to 11.

6. The method according to claim 1 wherein oxygen bearing gas is continuously recirculated from above the body of slurry in the reaction vessel into said body at a substantial depth below its surface.

7. The method of recovering lead and zinc from a concentrate of sulfidic minerals thereof containing iron sulfide which comprises forming a slurry of said minerals in finely divided form in an aqueous solution containing ammonium sulfate and free ammonia, passing said slurry into a closed leaching vessel at a pressure not exceeding 30 psig. introducing oxygen into said vessel in amount sufficient to establish an oxygen partial pressure of at least several psi, maintaining the temperature of the slurry in said vessel in the range from 60°C. to the boiling temperature, vigorously agitating the body of slurry in said vessel while continuously recirculating oxygen-bearing gas from above the body of agitated slurry into said body at a substantial depth below the surface of said body, whereby the zinc sulfide is dissolved and the sulfidic lead content of the minerals is substantially oxidized to the form of substantially water-insoluble oxidic lead compounds, subsequently withdrawing the slurry from the reaction vessel and separating the insoluble residue from the aqueous zinc-bearing solution, recovering zinc from said solution, subjecting the residue to a froth flotation operation to form a concentrate containing substantially all the iron sulfide and a tailing containing substantially all the oxidic lead compounds, and recovering lead from said tailing.

8. The method according to claim 7 wherein the slurry in the reaction vessel in mechanically agitated with a vigor of of at least 0.05 horsepower per cubic foot.

9. The method according to claim 7 wherein the total pressure maintained in the reaction vessel is in the range from 3 to 8 psig.

10. The method according to claim 7 wherein the pH of the slurry in the reaction vessel is in the range from 9 to 11.

* * * * *